US009177217B2

(12) United States Patent
Sasaki et al.

(10) Patent No.: US 9,177,217 B2
(45) Date of Patent: Nov. 3, 2015

(54) INFORMATION DETECTION APPARATUS AND INFORMATION DETECTION METHOD

(71) Applicant: TOSHIBA TEC KABUSHIKI KAISHA, Shinagawa-ku, Tokyo (JP)

(72) Inventors: Yuta Sasaki, Shizuoka-ken (JP); Hitoshi Iizaka, Shizuoka-ken (JP); Hidemi Mihara, Shizuoka-ken (JP); Hidehiro Naito, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 182 days.

(21) Appl. No.: 13/752,479

(22) Filed: Jan. 29, 2013

(65) Prior Publication Data

US 2013/0208946 A1 Aug. 15, 2013

(30) Foreign Application Priority Data

Jan. 31, 2012 (JP) ................................. 2012-018802

(51) Int. Cl.
*G06K 9/18* (2006.01)
*G07G 1/00* (2006.01)
*G06K 9/32* (2006.01)
*G06Q 20/20* (2012.01)

(52) U.S. Cl.
CPC ................ *G06K 9/18* (2013.01); *G06K 9/3216* (2013.01); *G06Q 20/208* (2013.01); *G07G 1/0045* (2013.01); *G07G 1/0063* (2013.01)

(58) Field of Classification Search
None
See application file for complete search history.

(56) References Cited

U.S. PATENT DOCUMENTS 7,413,122 B2 * 8/2008 Murofushi et al. ............ 235/383
8,628,014 B1 * 1/2014 Hoffer, Jr. ................ 235/462.01

(Continued)

FOREIGN PATENT DOCUMENTS

JP 53-53228 5/1978
JP 56-080778 7/1981

(Continued)

OTHER PUBLICATIONS

Japanese Office Action for Japanese Patent Application No. 2012-211467 mailed on Feb. 25, 2014.
Japanese Office Action for Japanese Patent Application No. 2014-206619 mailed on Sep. 1, 2015.

*Primary Examiner* — Jon Chang
(74) *Attorney, Agent, or Firm* — Amin, Turocy & Watson, LLP

(57) ABSTRACT

According to one embodiment, an information detection apparatus includes an image input unit, a symbol detection unit, a service information detection unit and an output unit. The image input unit inputs an image captured by an image capturing apparatus. The symbol detection unit configured to detect a first symbol and a second symbol, which are predetermined, according to the image input by the image input unit. The service information detection unit configured to detect a service information existing at a relative position predetermined for the first symbol and the second symbol in the image when the first symbol and the second symbol are detected by the symbol detection unit according to the image input by the image input unit. The output unit configured to output the service information detected by the service information detection unit.

12 Claims, 6 Drawing Sheets

(56) References Cited

U.S. PATENT DOCUMENTS

| | | | |
|---|---|---|---|
| 2011/0304879 A1* | 12/2011 | Kakutani | 358/1.15 |
| 2011/0315764 A1 | 12/2011 | Suzuki | |
| 2012/0000980 A1* | 1/2012 | Suzuki | 235/454 |
| 2012/0047037 A1* | 2/2012 | Ueda et al. | 705/23 |
| 2012/0059704 A1* | 3/2012 | Yanagi | 705/14.27 |
| 2012/0226566 A1* | 9/2012 | Kato | 705/17 |
| 2013/0054344 A1* | 2/2013 | Iizaka | 705/14.38 |

FOREIGN PATENT DOCUMENTS

| | | |
|---|---|---|
| JP | 62-298885 | 12/1987 |
| JP | 07-200730 | 8/1995 |
| JP | 08-331286 | 12/1996 |
| JP | 2008-033640 | 2/2008 |
| JP | 2012-014271 | 1/2012 |

* cited by examiner

INFORMATION DETECTION APPARATUS AND INFORMATION DETECTION METHOD

CROSS-REFERENCE TO RELATED APPLICATION

This application is based upon and claims the benefit of priority from Japanese Patent Application No. 2012-018802, filed Jan. 31, 2012, the entire contents of which are incorporated herein by reference.

FIELD

Embodiments described herein relate to an information detection apparatus and an information detection method for detecting various kinds of information according to an image captured by a capturing apparatus.

BACKGROUND

In a store such as a supermarket and the like, the application that a markdown label marking a marked-down price is stuck on a commodity and the like approaching a freshness date to realize the promotion of the sale of the commodity is widely implemented.

In addition, formerly, an information detection apparatus using a capturing component such as a CCD (Charge Coupled Apparatus) imaging sensor and the like to capture the markdown label stuck near a bar code and the bar code together and detecting a commodity recognition code and service information (the marked-down price) represented by the markdown label according to a captured image existed. Such an apparatus, for example, is connected with a POS (Point Of Sales) terminal in a communication way. Moreover, the POS terminal constructs a settlement system of the store in the way of carrying out markdown sale on the commodity on which the markdown label is stuck according to the commodity recognition code and the service information detected by the information detection apparatus.

DETAILED DESCRIPTION

According to one embodiment, an information detection apparatus includes an image input unit, a symbol detection unit, a service information detection unit and an output unit. The image input unit inputs an image captured by an image capturing apparatus. The symbol detection unit configured to detect a first symbol and a second symbol, which are predetermined, according to the image input by the image input unit. The service information detection unit configured to detect a service information existing at a relative position predetermined for the first symbol and the second symbol in the image when the first symbol and the second symbol are detected by the symbol detection unit according to the image input by the image input unit. The output unit configured to output the service information detected by the service information detection unit.

The embodiment is described with reference to drawings. In each embodiment, as the information detection apparatus, a vertical scanner apparatus (a so-called vertical scanner) vertically arranged on a cash desk arranged in a store such as a supermarket and the like is exampled.

[The Structure of a System]

Figure 1:
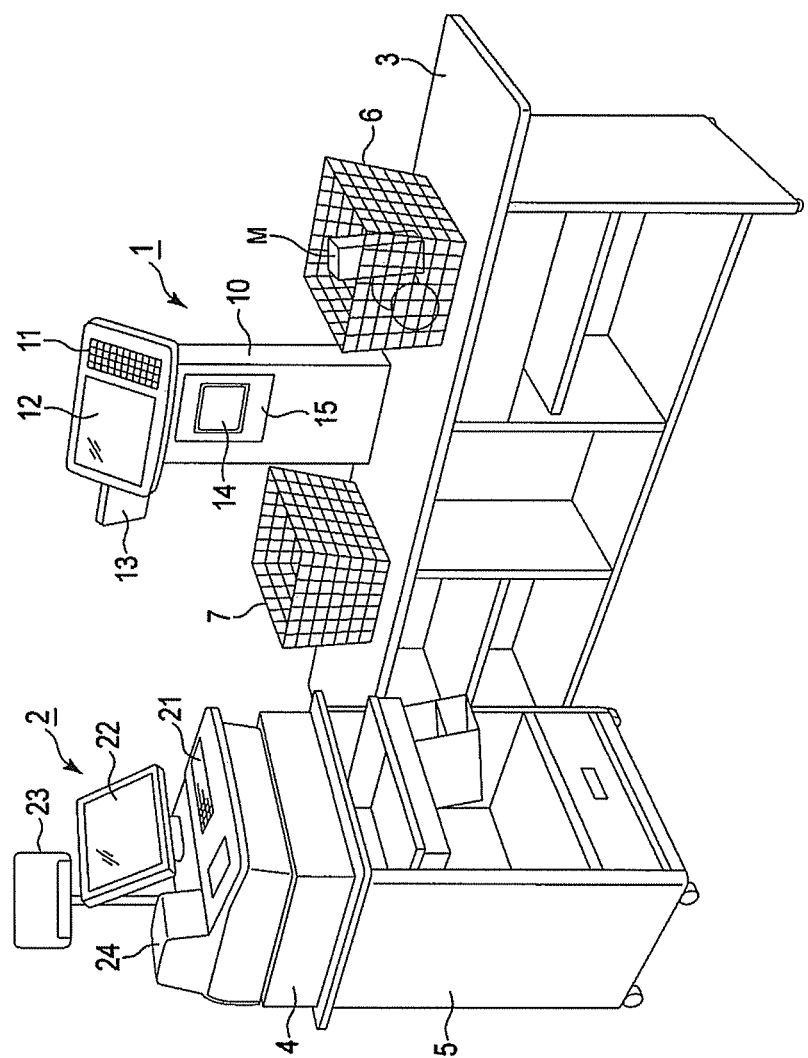
FIG. 1 is an outside view of a store settlement system according to one embodiment.

FIG. 1 is an outside view of a store settlement system to which the embodiment relates. The system comprises a scanner apparatus 1 and a POS (Point Of Sales) terminal 2. The scanner apparatus 1 is vertically arranged on the cash desk 3 arranged along a checkout lane as a passage of a customer receiving a settlement. The POS terminal 2 is borne on a drawer 4. The drawer 4 is borne on a cash register 5 arranged near one end of the cash desk 3. The scanner apparatus 1 is connected with the POS terminal 2 in the way of being capable of communicating with each other through a communication cable which is not shown in figures. A working space of a salesclerk in charge of the settlement, that is, a so-called cashier, is arranged in the front of the cash desk 3 in FIG. 1.

The scanner apparatus 1 comprises a keyboard 11 consisting of various operational keys, a display for operator 12 such as a liquid crystal display apparatus and a display for customer 13. The keyboard 11 and the display for operator 12 are mounted above a housing 10 forming a main body of the scanner apparatus 1 with the state that their operation surfaces and display surfaces are inclined towards the side of the working space of the cashier. The display for customer 13 is mounted on the housing 10 in the way that its display surface faces to the side of the checkout lane.

A capturing apparatus 14 is internally arranged in the housing 10. In addition, a rectangular reading window 15 is formed on the front surface of the side of the working space of the housing 10. The capturing apparatus 14 comprises a CCD (Charge Coupled Apparatus) capturing component which is a regional image sensor, its driving circuit and a capturing lens used for imaging the image of a capturing region in the CCD capturing component. The so-called capturing region means the region of the frame image of a region imaged in the CCD capturing component by the capturing lens from the reading window 15. The capturing apparatus 14 outputs the image data of the capturing region imaged in the CCD capturing component by the capturing lens.

The POS terminal 2 comprises a keyboard 21 consisting of various operational keys, a display for operator 22 such as the liquid crystal display apparatus, a display for customer 23, and a printer 24 such as a thermal printer.

Compared with the scanner apparatus 1 of the cash desk 3, a goods receiving surface at the upstream side of the checkout lane is a space used for placing a shopping basket 6 in which a commodity M which is purchased by the customer and is not registered is put. In addition, a goods receiving surface at a downstream side is a space used for placing a shopping basket 7 in which a commodity M registered by the scanner apparatus 1 is put.

Figure 2:
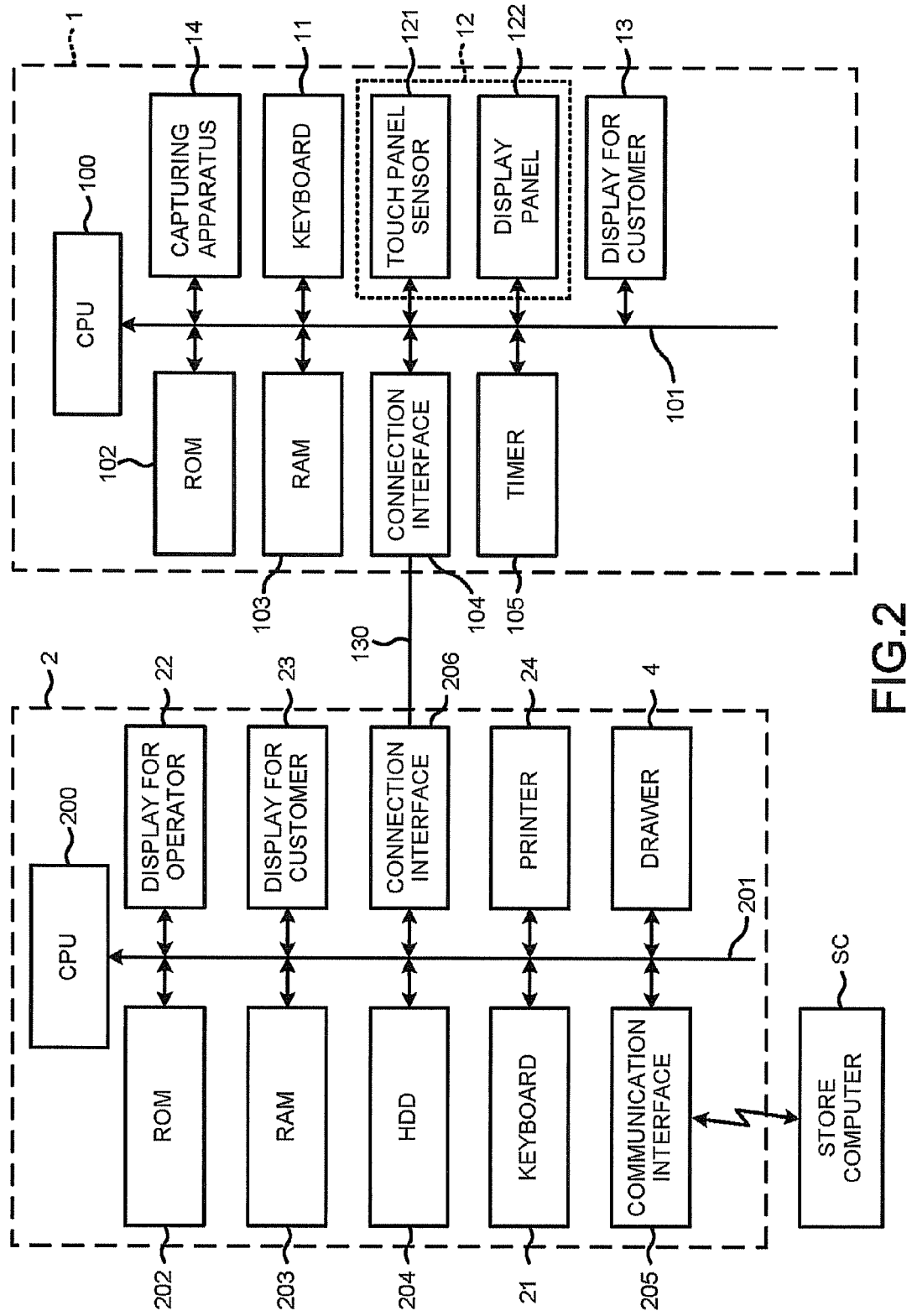
FIG. 2 is a block diagram showing the structures of main parts of the system.

FIG. 2 is a block diagram showing the structures of main parts of the store settlement system.

The scanner apparatus 1 comprises a CPU (Central Processing Unit) 100 playing roles as a control main center. On the CPU 100, an ROM (Read Only Memory) 102, an RAM (Random Access Memory) 103, a connection interface 104, a timer 105, the capturing apparatus 14, the keyboard 11, a touch panel sensor 121 and a display panel 122 of the display for operator 12, and the display for customer 13 are connected through a bus line 101 consisting of an address bus or a data bus.

The ROM 102 stores a computer program executed by the CPU 100 or various fixed values and the like. An information detection program described hereinafter is included in the computer program. The RAM 103 plays the role as a main memory of the scanner apparatus 1. On the connection interface 104, a communication cable 130 used for communicating with the POS terminal 2 is connected. By the connection, the scanner apparatus 1 will be capable of sending and receiving data with the POS terminal 2. The timer 105 counts time when an instruction is sent out from the CPU 100.

The POS terminal 2 comprises a CPU 200 plays the roles as the control main center. On the CPU 200, an ROM 202, an RAM 203, an HDD (Hard Disk Drive) 204, the keyboard 21, a communication interface 205, the display for operator 22, the display for customer 23, a connection interface 206, the printer 24, the drawer 4 and the like are connected through a bus line 201 consisting of the address bus or the data bus.

The ROM 202 stores the computer program executed by the CPU 200 or the various fixed values and the like. The RAM 203 plays the role as a main memory of the POS terminal 2.

The communication interface 205 is connected with a store computer SC acting as a main center of the store through a network such as an LAN (Local Area Network) and the like. By the connection, the POS terminal 2 can send and receive the data with the store computer SC. For example, the POS terminal 2 receives a commodity master from the store computer SC in a specified fixed time. The commodity master is a file establishing relevance for the commodity recognition code such as a JAN code and the like allocated to a commodity processed in the store and commodity information such as the name or the unit price and the like of the commodity of the commodity recognition code. The received commodity master, for example, is stored in the HDD 204. The connection interface 206 is connected with the communication cable 130.

Figure 3:
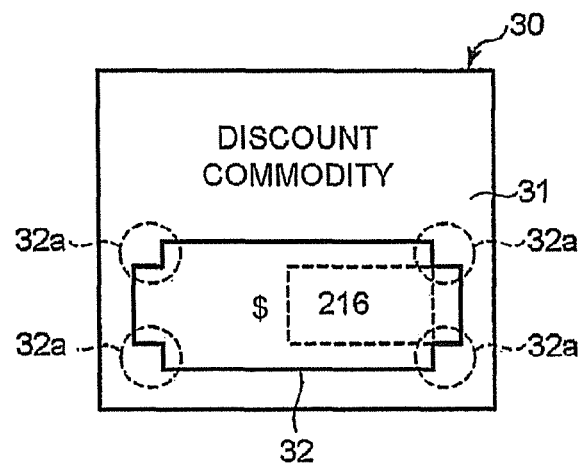
FIG. 3 is a schematic diagram of a markdown seal used in a store where the system works.

In the store where the store settlement system to which the present embodiment relates works, the application that a markdown seal 30 (also called as price seal) shown in FIG. 3 is stuck on the commodity and the commodity approaching the freshness date is subjected to markdown sale as a "discount commodity" is adopted. The markdown seal 30 is formed by printing a border line 32 enabling each corner in a rectangular shape to be prominent towards an inner side and a marked-down commodity price ("$216" in FIG. 3) on the printing surface of a pasteboard 31. In the following descriptions, the prominent part of each corner of the border line 32 is called as corner mark 32a.

Figure 4:
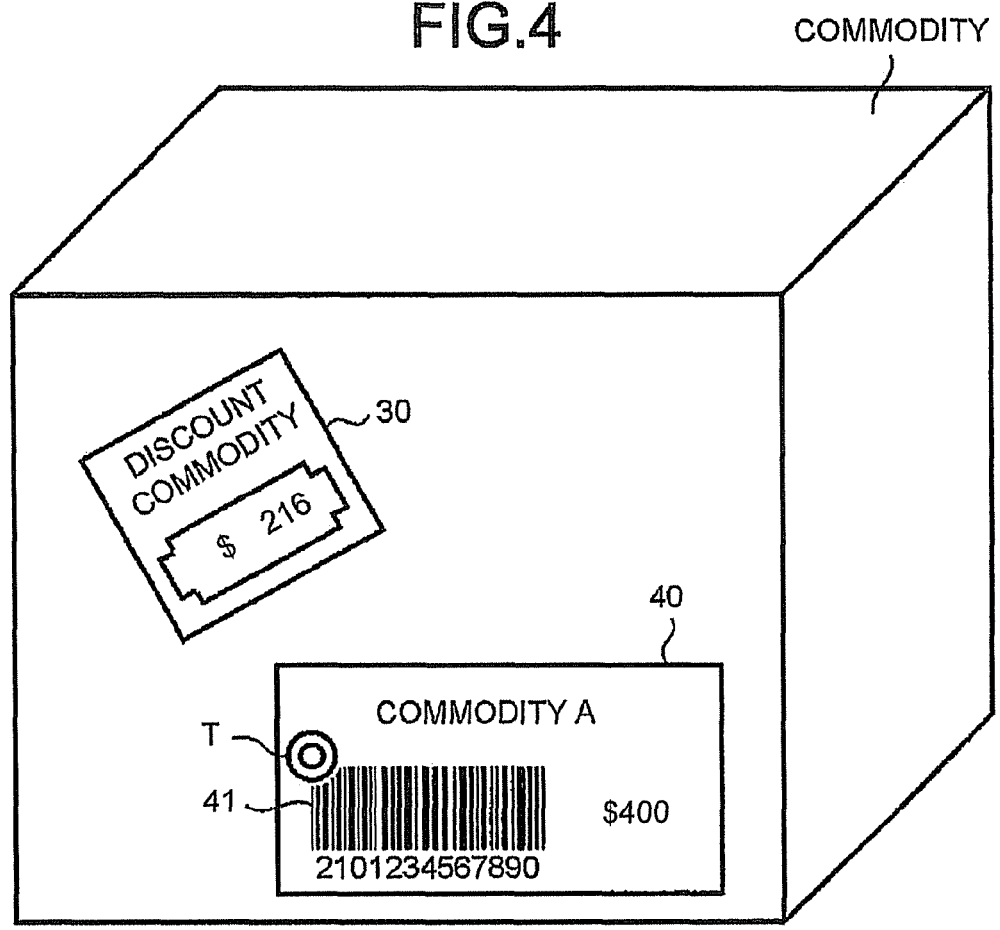
FIG. 4 is a drawing showing the usage mode of the markdown seal in the store where the system acts.

The markdown seal 30, for example, as shown in FIG. 4, is stuck on the periphery of a bar code label 40 given to the commodity. The bar code label 40 includes a commodity name ("commodity A" in FIG. 4), a commodity price ("$400" in FIG. 4) and a bar code 41 encodes the commodity recognition code of the commodity.

In the store, the application that a trigger label T is stuck on the periphery of the bar code label 40 given to the commodity when the markdown seal 30 is stuck on the commodity is adopted. The trigger label T is formed by printing two concentric circles on a label pasteboard, and for example, is stuck with the bar code 41 in a partial superimposition way.

Figure 5:
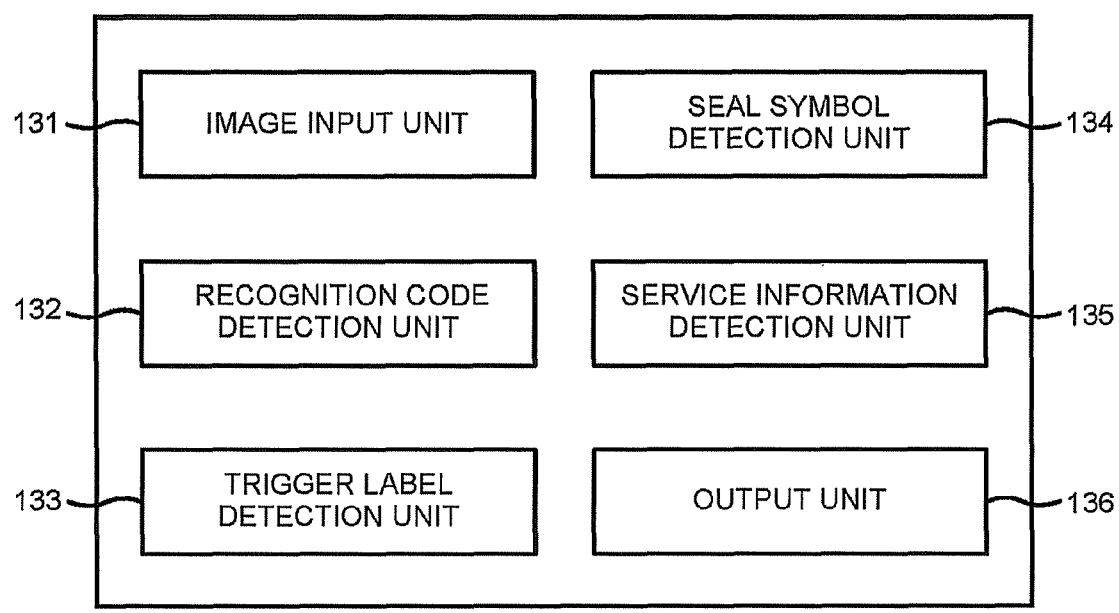
FIG. 5 is a drawing of functions realized by a scanner apparatus that the system comprises.

The CPU 100 of the scanner apparatus 1 realizes functions as an image input unit 131, a recognition code detection unit 132, a trigger label detection unit 133, a seal symbol detection unit 134, a service information detection unit 135 and an output unit 136, which are shown in FIG. 5, by executing the information detection program stored in the ROM 102.

The image input unit 131 outputs a capturing-on signal to the capturing apparatus 14 to start a capturing action, simultaneously inputs the image captured by the capturing apparatus 104 and stores the image in an imaging working area of the RAM 103.

The recognition code detection unit 132 recognizes the bar pattern of the bar code 41, for example, by using the known pattern matching technology according to the image written in the image working area and encodes the recognized bar pattern, so as to detect the commodity recognition code represented by the bar code 41.

The trigger label detection unit 133 tries the detection of the trigger label T according to the image written in the image working area. More particularly, the trigger label detection unit 133 carries out edge processing on the image by differential processing and the like and compares each unit in the edge-processed image with the edge-processed shape (becoming four concentric circles) of the trigger label T previously stored in the ROM 102, and the trigger label T is thought to be detected when consistent patterns are discovered.

When the trigger label detection unit 133 detects the trigger label T, the seal symbol detection unit 134 tries the detection of the first symbol included in the markdown seal 30 according to the image written in the image working area, and tries the detection of the second symbol if the first symbol can be detected. In the present embodiment, a mark "$" representing a monetary unit is taken as the first symbol, and each corner mark 32a is taken as the second symbol. The first symbol and the second symbol also can be detected with a method the same as the trigger label T.

When the seal symbol detection unit 134 detects the "$" as the first symbol and any three corner marks including two corner marks on a right side in the corner marks 32a as the second symbol, the service information detection unit 135 detects a character row existing at the relative position predetermined for the first symbol and the second symbol as the service information according to the image written in the image working area. In the present embodiment, the relative position is supposed to be in a region surrounded by the border line 32 designed with each corner mark 32a as the second symbol, that is, is taken as the right side of the mark "$" as the first symbol. That is, in the markdown seal 30 shown in FIG. 3, the relative position is the position of the character row "216" surrounded by a rectangular dotted line. The service information detection unit 135 detects the character row existing at the relative position by carrying out character recognition processing such as an OCR (Optical Character Reader) and the like or based on the pattern matching of object recognition processing.

The output unit 136 sends the commodity recognition code detected by the recognition code detection unit 132 to the POS terminal 2. In addition, if the service information detection unit 135 detects the service information, the output unit 136 sends the service information together with the commodity recognition code detected by the recognition code detection unit 132 to the POS terminal 2 and displays the service information on the display for operator 12.

The POS terminal 2 reads out the commodity information corresponding to the commodity recognition code output by the output unit 136 from the commodity master and writes the commodity information in a commodity registration buffer formed in the RAM 203. In addition, if the service information is output together with the commodity recognition code, the service information is written in the commodity registration buffer together with the commodity information corresponding to the commodity recognition code. Moreover, the total payment of a deal is calculated according to the commodity information and the service information written in the commodity registration buffer in one deal, and the settlement of the deal is terminated by the input of a prepaid payment, the calculation of change, the printing of a receipt carried out by the printer 24, the opening of the drawer 4, and the like.

[Actions]

The details of the actions of the scanner apparatus 1 are described.

Figure 6:
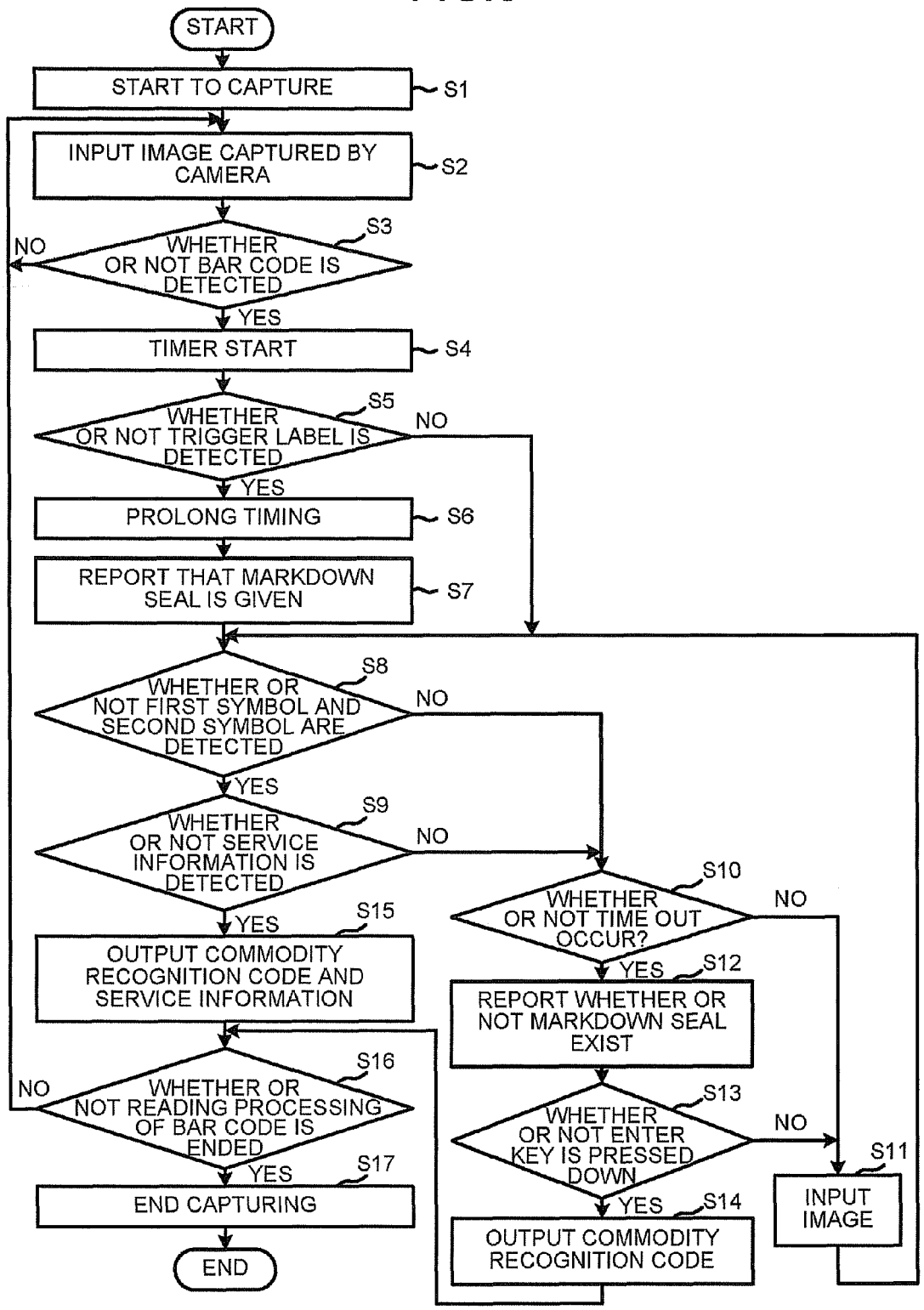
FIG. 6 is a flow chart showing the actions of the scanner apparatus that the system comprises.

If the cashier operates the POS terminal 2 to declare the start of settlement processing, the settlement processing starts from the moment when the POS terminal 2 indicates the scanning to the scanner apparatus 1. When the indication is received, the CPU 100 of the scanner apparatus 1 reads out the information detection program stored in the ROM 102 from the RAM 103, executes the information detection program, and carries out the actions according to a flow chart in FIG. 6.

That is, first, the CPU 100 outputs the capturing-on signal to the capturing apparatus 14, so that the capturing apparatus 14 starts capturing (ACT S1). After the start of the settlement processing is declared, the cashier takes out the commodity M put in the shopping basket 6 in sequence and puts the commodity M in the front of the reading window 15 to carry out scanning.

After the capturing starts, the CPU 100 plays the role as the image input unit 131, inputs the image captured by the capturing apparatus 14 and stores the image in the image working area of the RAM 103 (ACT S2). Subsequently, the CPU 100 plays the role as the recognition code detection unit 132 and tries the detection of the commodity recognition code according to the image written in the image working area (ACT S3). If the commodity recognition code is not detected (ACT S3: No), the processing is returned to the ACT S2, and the CPU 100 tries the input of the image and the detection of the commodity recognition code again.

Afterwards, if the commodity recognition code is detected (ACT S3: Yes), the CPU 100 enables the timer 105 to start the time counting of a specified time (ACT S4). After the time counting starts, the CPU 100 plays the role as the trigger label detection unit 133 and tries the detection of the trigger label T according to the image written in the image working area (ACT S5). If the trigger label T is detected (ACT S5: Yes), the CPU 100 prolongs the specified time counted by the timer 105 for a certain time (ACT S6) and displays a message meaning that the markdown seal 30 is given to the commodity shielded by the reading window 15 currently on the display for operator 12 (ACT S7).

After the ACT S7 or when the trigger label T is not detected in the ACT S5 (ACT S5: No), the CPU 100 plays the role as the seal symbol detection unit 134 and tries the detection of the first symbol and the second symbol according to the image written in the image working area (ACT S8). When the mark "$" as the first symbol and the any three corner marks including the two corner marks on the right side in the corner marks 32a as the second symbol are detected (ACT S8), the CPU 100 plays the role as the service information detection unit 135 and tries the detection of the service information existing at the relative position for the first symbol and the second symbol (ACT S9).

When two or one of the first symbol and the second symbol is not detected in the ACT S8 (ACT S8: No) and when the service information is not detected in the ACT S9 (ACT S9: No), the CPU 100 judges whether or not the timer 105 terminates the counting of the specified time (whether or not a time out occurs) (ACT S10). If the time out does not occur (ACT S10: No), the CPU 100 plays the role as the image input unit 131, inputs the image captured by the capturing apparatus 14 and updates the image working area in the image (ACT S11). Afterwards, the CPU 100 returns to the ACT S8 and executes the later actions again.

When the markdown seal 30 is not stuck on the commodity in the front of the reading window 15 or the markdown seal 30 is stuck but each symbol or the service information cannot be read out, finally, the timer 105 has the time out (ACT S10: Yes). At the moment, the CPU 100 displays a message inquiring whether or not the markdown seal 30 is stuck on the commodity on the display for operator 12 (ACT S12) and judges whether or not an enter key arranged on the keyboard 11 is operated (ACT S13). If the enter key is not operated (ACT S13: No), the processing is transferred to the ACT S11. If the enter key is operated (ACT S13: Yes), the CPU 100 plays the role as the output unit 136 and sends the commodity recognition code detected in the ACT S3 to the POS terminal 2 (ACT S14).

In addition, before the timer 105 has the time out, when the first symbol and the second symbol are detected (ACT S8: Yes) and the service information is further detected (ACT S9: Yes), the CPU 100 plays the role as the output unit 136 and sends the commodity recognition code detected in the ACT S3 and the service information detected in the ACT S9 to the POS terminal 2 (ACT S15).

When the commodity recognition code sent in the ACT S14 is received, the POS terminal 2 reads out the commodity information corresponding to the code from the commodity master and writes the commodity information in the commodity registration buffer formed in the RAM 203. In addition, when the commodity recognition code and the service information sent in the ACT S15 are received, the POS terminal 2 writes the service information in the commodity registration buffer together with the commodity information corresponding to the code.

After the ACT S14 or the ACT S15, the CPU 100 judges whether or not to indicate the termination of the reading of the bar code (ACT S16). The termination of the reading of the bar code is indicated by the operation of a subtotal key arranged on the keyboard 11 of the scanner apparatus 1 or the keyboard 21 of the POS terminal 2.

When the termination of the reading of the bar code is not indicated (ACT S16: No), the CPU 100 repeats the actions after the ACT S2, and subsequently, the cashier takes the commodity shielded by the reading window 15 as a target, the processing of the ACTs S2-S15 is executed. On the other hand, when the termination of the reading of the bar code is indicated (ACT S16: Yes), the CPU 100 outputs a capturing-off signal to the capturing apparatus 14, so that the capturing apparatus 14 stops the capturing (ACT S17). Hereinbefore, a series of actions are terminated.

After the termination of the reading of the bar code is indicated, the POS terminal 2 calculates the total payment of the deal with reference to a registration working area and terminates the settlement of the deal by the input of the prepaid payment, the calculation of the change, the printing of the receipt carried out by the printer 24, the opening of the drawer 4, and the like. At the moment, the POS terminal 2 takes the unit price included in the commodity information as the payment of the commodity aiming at the commodity information to which the service information is not attached, takes the payment shown by the service information as the payment of the commodity aiming at the commodity information to which the service information is attached, and calculates the total payment.

As described above, when the scanner apparatus 1 to which the present embodiment relates scans the bar code of the commodity, the cashier does not carry out a special operation while the scanner apparatus 1 automatically reads the markdown seal 30 given to the commodity. Moreover, the reading is carried out according to the ACTs of first trying the detection of the first symbol (the mark "$") included in the markdown seal 30, trying the detection of the second symbol (more than three corner marks 32a) if the first symbol can be detected, and recognizing the service information existing at the relative position determined for the first symbol and the second symbol if the second symbol can be detected. In this way, when a plurality of symbols can be detected, if the ACTs of detecting the service information are based, the trouble that a character row and the like printed on the commodity per se are wrongly recognized as the character row of the markdown seal 30 is greatly reduced.

In addition, the structure according to the present embodiment can obtain various excellent effects.

A Modified Example

The structure disclosed by the embodiment can be implemented by carrying out various modifications.

For example, in the embodiment, as one example of the information detection apparatus, the scanner apparatus 1 reading the commodity recognition code from the bar code included in the image captured by the capturing apparatus 14 is disclosed. However, the information detection apparatus also can be an apparatus reading the commodity recognition code from a two-dimension code included in the image captured by the capturing apparatus 14 and also can be an apparatus recognizing the commodity by utilizing an object recognition technology according to the appearance characteristic (such as a shape, a color, a look and the like) of the commodity per or its package included in the image.

In addition, the information detection apparatus also can be incorporated in a self type POS terminal (a so-called self-service checkout terminal) terminating a series of settlement processing by the operation of the customer.

In addition, besides the commodity price printed on the markdown seal 30, the information detection apparatus also can detect a discount rate or a marked-down payment as the service information according to the label on which the discount rate or the marked-down payment and the like are printed.

In addition, in the embodiment, the first symbol is taken as the mark "$", the second symbol is taken as the corner mark 32a, but the first symbol and the second symbol are not limited to that. The first symbol and the second symbol also can be altered appropriately according to the design of the markdown seal.

Figure 7:
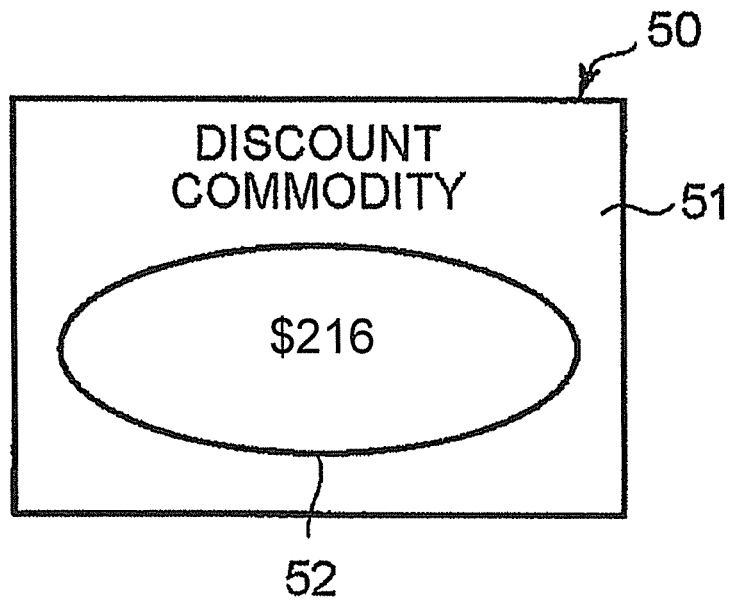
FIG. 7 is a schematic diagram of a markdown seal to which a modified example relates.
Figure 8:
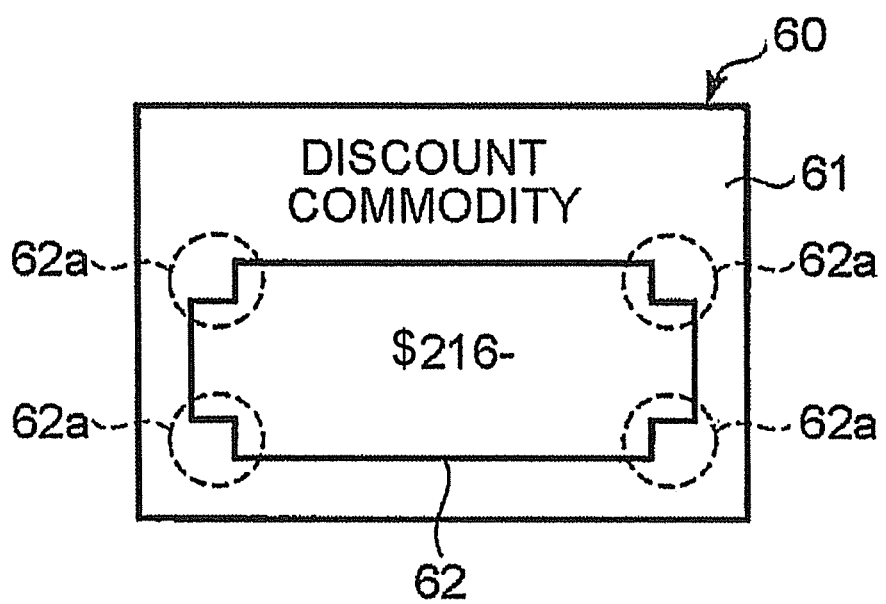
FIG. 8 is a schematic diagram of the markdown seal to which the modified example relates.

FIG. 7 and FIG. 8 show a modified example of the design of the markdown seal.

A markdown seal 50 shown in FIG. 7 is formed by printing a border line 52 in an elliptical shape and the marked-down commodity price ("$216" in FIG. 7) on a pasteboard 51. In the markdown seal designed in this way, for example, a mark "$" is taken as the first symbol, and the border line 52 per se is taken as the second symbol. In addition, the relative position of the service information detected by the service information detection unit 135 is supposed to be in a region surrounded by the border line 52 taken as the second symbol and on the right side of the mark "$" taken as the first symbol.

In addition, a markdown seal 60 shown in FIG. 8 is formed by printing a border line 62 which is in the same shape as the border line 32 of the markdown seal 30 shown in FIG. 3 and whose corner mark 62a is arranged at each corner and the marked-down commodity price ("$216-" in FIG. 8) on a pasteboard 61. In the markdown seal designed in this way, for example, the first symbol consists of the mark "$" and a mark "-" (a end mark), and each corner mark 62a is taken as the second symbol. In addition, the relative position of the service information detected by the service information detection unit 135 is supposed to be in a region surrounded by the border line 62 provided with each corner mark 62a taken as the second symbol, that is, is a region included by the mark "$" taken as the first symbol and the mark "-". If the relative position is defined in this way, the initial point and the end point of the service information are judged easily.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information detection apparatus, comprising:
    a processor that executes or facilitates execution of computer executable units stored in a memory, the computer-executable units comprising:
        an image input unit configured to input an image captured by an image capturing apparatus;
        a symbol detection unit configured to detect a first symbol and a second symbol, which are predetermined, according to the image input by the image input unit;
        a service information detection unit configured to detect a service information existing at a relative position predetermined for the first symbol and the second symbol in the image when the first symbol and the second symbol are detected by the symbol detection unit according to the image input by the image input unit; and
        an output unit configured to output the service information detected by the service information detection unit,
        wherein the first symbol is a symbol representing a monetary unit, the second symbol is the shape of a border line surrounding the symbol, and the relative position is defined relative to the first symbol and located in a region surrounded by the border line.

2. The information detection apparatus according to claim 1, wherein the shape of the border line is rectangular with corners projecting towards an inner side of the boarder line.

3. The information detection apparatus according to claim 1, further comprising:
    a recognition code detection apparatus configured to detect a recognition code of a commodity from a code symbol in the image input by the image input unit, wherein
    the output unit outputs the recognition code detected by the recognition code detection unit in addition to the service information detected by the service information detection unit.

4. The information detection apparatus according to claim 3, further comprising a trigger label detection unit configured to detect a trigger label.

5. The information detection apparatus according to claim 4, wherein if the trigger label is detected, a time, which the symbol detection unit spends detecting the first symbol and the second symbol, is extended.

6. The information detection apparatus according to claim 5, wherein the trigger label indicates the presence of a markdown seal.

7. An information detection method, comprising:
inputting an image captured by an image capturing apparatus;
detecting a first symbol and a second symbol, which are predetermined, according to the input image;
detecting a service information existing at a relative position predetermined for the first symbol and the second symbol in the image when the first symbol and the second symbol are detected according to the input image; and
outputting the detected service information,
wherein the first symbol is a symbol representing a monetary unit, the second symbol is the shape of a border line surrounding the symbol, and the relative position is defined relative to the first symbol and located in a region surrounded by the border line.

8. An information detection apparatus, comprising:
a processor that executes or facilitates execution of computer executable units stored in a memory, the computer-executable units comprising:
an image input unit configured to input an image captured by an image capturing apparatus;
a symbol detection unit configured to detect a first symbol and a second symbol, which are predetermined, according to the image input by the image input unit;
a service information detection unit configured to detect a service information existing at a relative position predetermined for the first symbol and the second symbol in the image when the first symbol and the second symbol are detected by the symbol detection unit according to the image input by the image input unit;
an output unit configured to output the service information detected by the service information detection unit; and
wherein the first symbol includes a symbol representing a monetary unit and an end mark in a specified shape, the second symbol is in the shape of a border line surrounding the symbol and the end mark, and the relative position is in the region surrounded by the border line and located between the symbol and the end mark.

9. The information detection apparatus according to claim 8, further comprising:
a recognition code detection apparatus configured to detect a recognition code of a commodity from a code symbol in the image input by the image input unit, wherein
the output unit outputs the recognition code detected by the recognition code detection unit in addition to the service information detected by the service information detection unit.

10. The information detection apparatus according to claim 9, further comprising a trigger label detection unit configured to detect a trigger label.

11. The information detection apparatus according to claim 10, wherein if the trigger label is detected, a time, which the symbol detection unit spends detecting the first symbol and the second symbol, is extended.

12. The information detection apparatus according to claim 11, wherein the trigger label indicates the presence of a markdown seal.

\* \* \* \* \*